(12) United States Patent
Koo

(10) Patent No.: US 6,973,025 B2
(45) Date of Patent: Dec. 6, 2005

(54) DEVICE FOR SELECTING NORMAL CIRCUIT IN COMMUNICATION SYSTEM

(75) Inventor: Ki Woong Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 897 days.

(21) Appl. No.: 09/847,321

(22) Filed: May 3, 2001

(65) Prior Publication Data
US 2001/0039628 A1 Nov. 8, 2001

(30) Foreign Application Priority Data
May 3, 2000 (KR) .............................. 2000-23720

(51) Int. Cl.$^7$ .......................................... G06F 11/00
(52) U.S. Cl. ..................... 370/217; 370/221; 370/225; 714/11; 714/13; 714/14; 713/323
(58) Field of Search ............................... 370/217, 219, 370/220, 221, 225; 714/6, 11, 13, 14; 713/323, 713/340

(56) References Cited

U.S. PATENT DOCUMENTS

| | | | | |
|---|---|---|---|---|
| 4,797,884 A | * | 1/1989 | Yalowitz et al. | 714/13 |
| 5,483,531 A | * | 1/1996 | Jouin et al. | 370/277 |
| 5,646,609 A | * | 7/1997 | O'Brien | 340/825.78 |
| 5,668,417 A | * | 9/1997 | Wiscombe et al. | 307/64 |
| 6,330,604 B1 | * | 12/2001 | Higuchi et al. | 709/226 |

* cited by examiner

*Primary Examiner*—Dang Ton
*Assistant Examiner*—Shick Hom
(74) *Attorney, Agent, or Firm*—Fleshner & Kim, LLP

(57) ABSTRACT

A device for selecting a normal circuit in a communication system includes at least one pair of general function circuit modules, one pair of control function circuit modules, one pair of power supply modules, and a separate processor for controlling the device for selecting a normal circuit. Of the one pair of the control function circuit modules, the attempt for interchanging states of the control function circuit module in an active state and the control function circuit module in a standby state is made possible from the control function circuit module in the active state without fail. For stabilization of an output, the control function circuit module in the active state is switched to the standby state after the control function circuit module in the standby state is switched to the active state by the selecting circuit.

18 Claims, 9 Drawing Sheets

DEVICE FOR SELECTING NORMAL CIRCUIT IN COMMUNICATION SYSTEM

BACKGROUND OF THE INVENTION

1. Field of the Invention

The present invention relates to a device for selecting a normal circuit in a communication system.

2. Background of the Related Art

System reliability is secured by various methods in a digital communication system to ensure stable services. FIG. 1 illustrates a diagram of an exemplary related art control circuit of a duplex communication system.

As shown in FIG. 1, the related art control circuit is provided with a D flipflop 124 for receiving a falling edge signal following software basis duplex switching, a D flipflop 121 for receiving a falling edge signal following software basis duplex switching, and a D flipflop 122 for receiving a signal from a positive output terminal Q of the D flipflop 121. A NAND gate 131 NANDs output signals of a negative output terminal Q– of the D flipflop 121 and the positive output terminal Q of the D flipflop 122 and provides an output signal to a clock terminal CLK of the D flipflop 124 as trigger pulses. A D flipflop 123 is for delaying an output of the NAND gate 131. A voltage comparator 125 is connected to an opposite side power terminal for monitoring drop of an opposite side voltage below a reference value, an inverter 126 is for inverting a function failure detection signal FFO received from an opposite side plane, and an AND gate 127 is for receiving outputs of the comparator 125 and the inverter 126. A NAND gate 130 is for receiving outputs of the AND gate 127 and the D flipflop 123 and an OR gate 129 is for receiving an output of the NAND gate 130 and a signal of a positive output terminal Q of a D flipflop 124 from the opposite side. An AND gate 128 is for ANDing an output of the OR gate 129 and a voltage Vcc from a power source and forwarding an output signal to a preset terminal of the D flipflop 124. The output terminal JCout is connected to a junction input terminal JCo and the input terminal JCin is connected to an opposite side input terminal JCino, and each plane monitors the opposite side for functional failure and DC voltage.

The operation of the related art control circuit shown in FIG. 1 will now be described. When one plane of the duplex device is initially turned on, a low level is provided to a clear terminal CL of the D flipflop 124 by the voltage comparator 125, the inverter 126, and the AND gate 127, and a moment later, one input terminal of the AND gate 128 is provided with a high level. Since the input to the AND gate 128 transits to a high level, an output of the AND gate 128 is provided to the preset terminal PR of the D flipflop 124 to transit an output terminal Q of the D flipflop 124 to a low level, which activates the plane JC=0). Then, when the other plane of the duplex device is initially turned on, a low level is provided to a preset terminal PR of the D flipflop 124 by a RC circuit connected to an input of the AND gate 128, to transit the output terminal Q of the D flipflop 124 to a high level, that puts the plane into a standby state (JC=1).

If there is a function failure occurred in the active plane during normal operation of the two planes, when a high level is provided to the input terminal FFO of the inverter 126 in the standby plane, since a low level is provided to the clear terminal CL of the D flipflop 124, and at the same time a high level is provided to the preset terminal PR, a low level is provided to the output terminal Q of the D flipflop 124. Then, a low level, a signal value of the output terminal Q on the D flipflop 124, is provided to one input terminal on the opposite side OR gate 129, when the other input terminal of the OR gate 129 is at a low level. A low level is provided to the preset terminal PR on the D flipflop 124, to transit the output terminal Q to a high level. Thus, a switching is made between duplex modules.

In the meantime, if the active plane is turned off in the middle of a normal operation, the voltage comparator 125 of the standby plane monitors drop of an opposite side voltage below a reference value, informs to the clear terminal CL and the preset terminal PR on the D flipflop 124, to cause a switching using the same above-described process. If the plane that is turned off is turned on again, the RC circuit connected to the input terminal on the AND gate 128 transits an initial state of the output terminal Q on the D flipflop 124 into a high level. That is, an output driver on the standby side gives an influence to the output driver on the active side to try and prevent losses in the clock and data transmission.

In the software basis switching, a falling edge signal is produced at an input terminal JCin of the standby plane. The signal is provided to an input terminal D on the D flipflop 124, and a low level trigger pulse is generated by the D flipflop 121, the D flipflop 122, and the NAND gate 131 and then provided to a clock terminal CLK on the D flipflop 124. The signal is then delayed at the D flipflop 123, and provided to the preset terminal PR on the D flipflop 124 through the NAND gate 130, the OR gate 129, and the AND gate 128 in a high level, to transit the output terminal Q on the D flipflop 124 into a low level, which activates the plane when the other input terminal on the NAND gate 130 is at a high level and the other input terminal on the OR gate 129 is at a low level. Then, a low level output Q signal value of the D flipflop 124 is provided to an input terminal on an opposite side OR gate 129, when the other input terminal of the OR gate 129 is at a low level. As a low level is provided to the preset terminal PR of the D flipflop 124, the output terminal Q transits to a high level. Thus, a software based switching is made between duplex modules.

FIG. 2 illustrates a diagram showing another exemplary related art control circuit for a duplex communication system to which the software basis duplex communication system is applied. As shown in FIG. 2, the related art control circuit for a duplex communication system is provided with a voltage comparator 125 connected to an opposite side power terminal for monitoring drop of an opposite side voltage below a reference value, an inverter 126 for inverting a function failure detection signal FFO received from an opposite side plane and an AND gate 127 for receiving an output of the voltage comparator 125 and an output of the inverter 126. A D flipflop 124 has a clock terminal for receiving a low level trigger pulse generated when the duplex modules are switched by the software, and a D flipflop 121 is for delaying a low level trigger pulse generated when the duplex modules are switched by the software. A NAND gate 130 is for subjecting a signal from a positive output terminal Q on the D flipflop 121 and an output signal of the AND gate 127 to a NAND operation, and an OR gate 129 is for subjecting an output of the NAND gate 130 and a signal from a positive output terminal Q on an opposite side D flipflop 124 to an OR operation. An AND gate 128 receives an output of the OR gate 129 and a voltage of a power source and provides a result of the AND operation to the preset terminal PR on the D flipflop 124. The output terminal JCout is connected to an opposite side input terminal JCo, and each plane monitors the opposite side for function failure and DC voltage.

The operation of the related art control circuit for a duplex communication system shown in FIG. 2 is identical to a case of FIG. 1 except the step for software basis controlled switching of the duplex modules and the operation therefor. The step for software basis operation by the related art control circuit in FIG. 2 will now be explained.

In making the software basis switching between the duplex modules, a low level trigger pulse is provided to the clock terminal CLK on the D flipflop 124 of the standby plane. Then, the low level trigger pulse is delayed at the D flipflop 121, provided to the input terminal D on the D flipflop 124, and then provided to the preset terminal PR on the D flipflop 124 through the NAND gate 130 and the OR gate 129 as a high level trigger pulse that transits the positive output terminal Q on the D flipflop 124 into a low level, when the other input terminal on the NAND gate 130, which receives a signal from the output terminal Q on the D flipflop 121 transits to a high level, and the input terminal on the OR gate 129 which receives a signal from the opposite side transits to a low level. On the other hand, a low level, a signal value of the output terminal Q on the D flipflop 124, is provided to the input terminal on the opposite side OR gate 129, when the other input terminal on the opposite side OR gate 129 is at a low level. Therefore, a low level is provided to the preset terminal PR on the D flipflop 124, to transit the output terminal Q on the D flipflop 124 to a high level. Thus, a switching is made between the duplex modules.

However, as described above, the related art devices for selecting a normal circuit in a communication system have various disadvantages. In the switching operation of the duplex circuit, when a standby circuit module corresponding to a selected circuit module is inserted to make the standby circuit module to come into an active state, the active state and standby states are switched in advance or alternate. In processor basis switching, an active circuit module first transits to a standby state, and the standby circuit module transits to an active state upon sensing the active circuit module being switched into the standby state. Since all modules in function blocks are disabled for one cycle period of the longest system clock in this step, there is a high possibility of data lost.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a device for selecting a normal circuit in a communication system that substantially obviates one or more of the problems caused by limitations and disadvantages of the related art.

Another object of the present invention is to provide a device and method for selecting a normal circuit in a communication system that can stabilize the system.

Another object of the present invention is to provide a device and method for selecting a normal circuit in a communication system that switches an initially standby state control module to an active state and then switches the initially active state control module to the standby state when switching control between a pair of active and standby control modules.

Another object of the present invention is to provide a device for selecting a normal circuit in a communication system that allows selection of normal modules even if a function error occurs, a power supply error of the circuit modules occurs, when a circuit module is removed or while a circuit module is mounted.

To achieve at least these and other advantages in a whole or in part and in accordance with a purpose of the present invention, as embodied and broadly described, a device for selecting a normal circuit in a communication system is provided that includes a plurality of pairs of general function circuit modules, one pair of control function circuit modules, a separate processor for controlling the device for selecting a normal circuit, one pair of power supply modules for supplying power to the device for selecting a normal module, at least one first selecting circuit for selecting one of the pairs of general function circuit modules that is in normal operation, and a second selecting circuit for selecting one of the pair of control function circuit modules mounted on a back board that is in normal operation.

To further achieve the above objects in a whole or in part, each control function circuit modules includes the first selecting circuit, which monitors states of a corresponding pair of general function circuit modules for selecting one general function circuit module that is in normal operation as active general function circuit module.

To further achieve the above objects in a whole or in part, a second selecting circuit can select one of the pair of control function circuit modules that are both in normal operations to be in the active state by using information from the processor, a function failure signal from each of the control function circuit modules, and a power fail signal from the power supply modules, and the switching can be attempted from the control function circuit module presently in the active state by the second selecting circuit without fail. The attempt from the control function circuit module in the standby state is disregarded by the second selecting circuit to ensure stabilization of the control function circuit modules during switching.

To further achieve the above objects in a whole or in part, for interchanging the states between the control function circuit module in the active state and the control function circuit module in the standby state, the control function circuit module in the active state informs the control function circuit module in the standby state that the control function circuit module in the active state will be switched to the standby state. Then, after the control function circuit module in the standby state is switched into the active state, the control function circuit module in the active state is switched to the standby state. The control function circuit module in the active state can be switched into the standby state by a reset switch in the second selection circuit, the processor, and dismounted from the board.

To achieve at least these and other advantages in a whole or in part and in accordance with a purpose of the present invention, as embodied and broadly described, a device for selecting a normal circuit in a communication system is provided that includes at least one pair of general function circuit modules, one pair of control function circuit modules, each of the control function circuit modules including at least one first selecting circuit that selects one of the two general function circuit modules in each of said at least one pair that is in normal operation and provides a respective function failure signal when the control function circuit modules have function failure, one pair of power supply modules that supply power to the modules and provide a respective power fail signal when a power failure occurs, a separate processor that controls the modules and a second selecting circuit that switches states of the two control function circuit modules responsive to the control of the processor and the failure signals, wherein the second selecting circuit switches the control function circuit module of the pair in an active state to a standby state after switching the control function circuit module of the pair in the standby state to the active state.

To achieve at least these and other advantages in a whole or in part and in accordance with a purpose of the present invention, as embodied and broadly described, a device for selecting a normal circuit in a communication system is provided that includes a plurality of pairs of circuit module means, first and second control circuit module means, wherein the first and second control circuit module means include a first selecting means that selects one of the two circuit module means in a selected pair and provides a respective function failure signal when the control circuit module means have a function failure, a separate control means that controls the device for selecting a normal circuit and a second selecting means that switches states of the two control circuit module means according to the control of the control means and the failure signals, for switching the first control circuit module means in an active state to a standby state after switching the second control circuit module means in the standby state.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
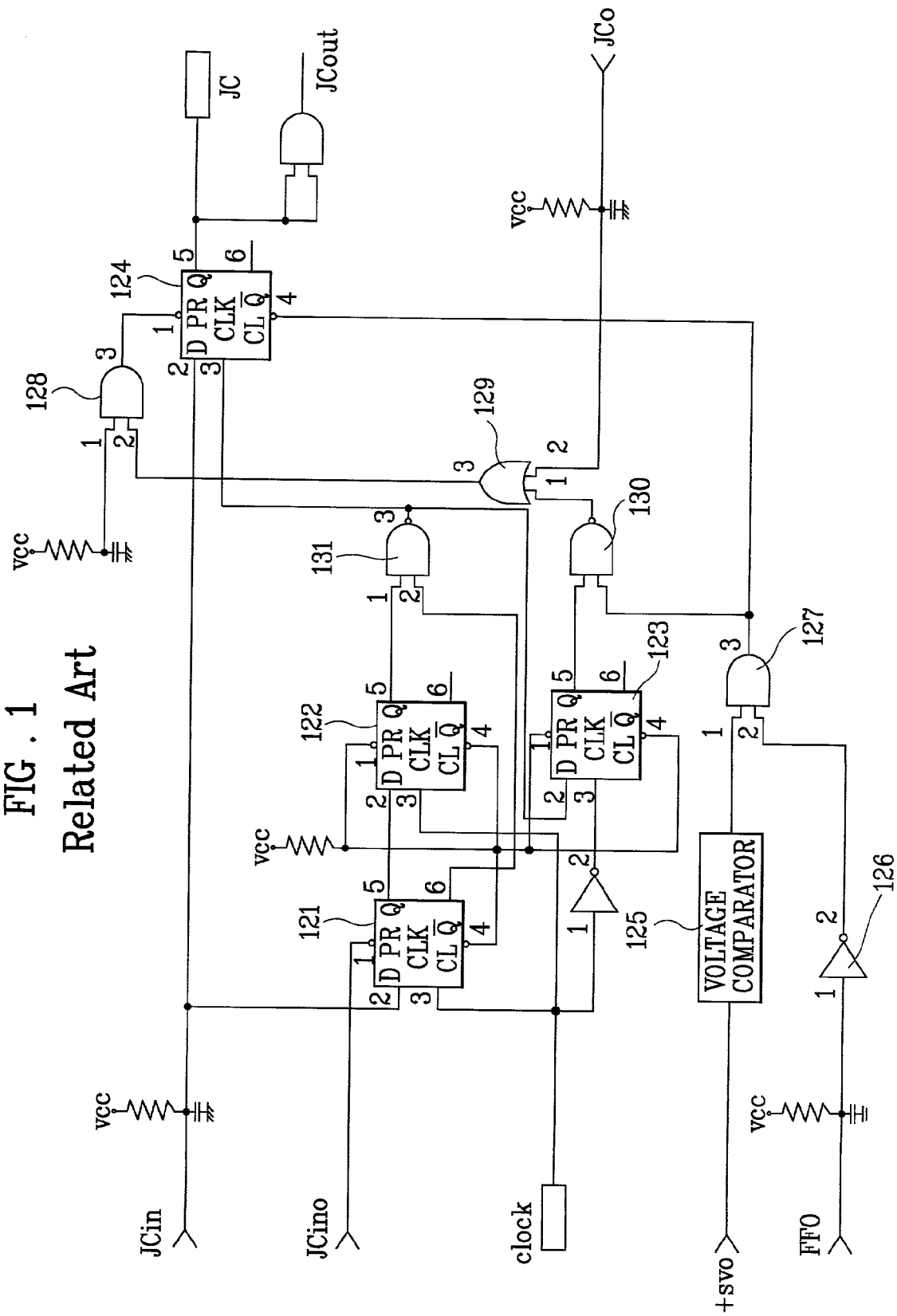
FIG. 1 illustrates a diagram of an exemplary related art control circuit of a duplex communication system.
Figure 2:
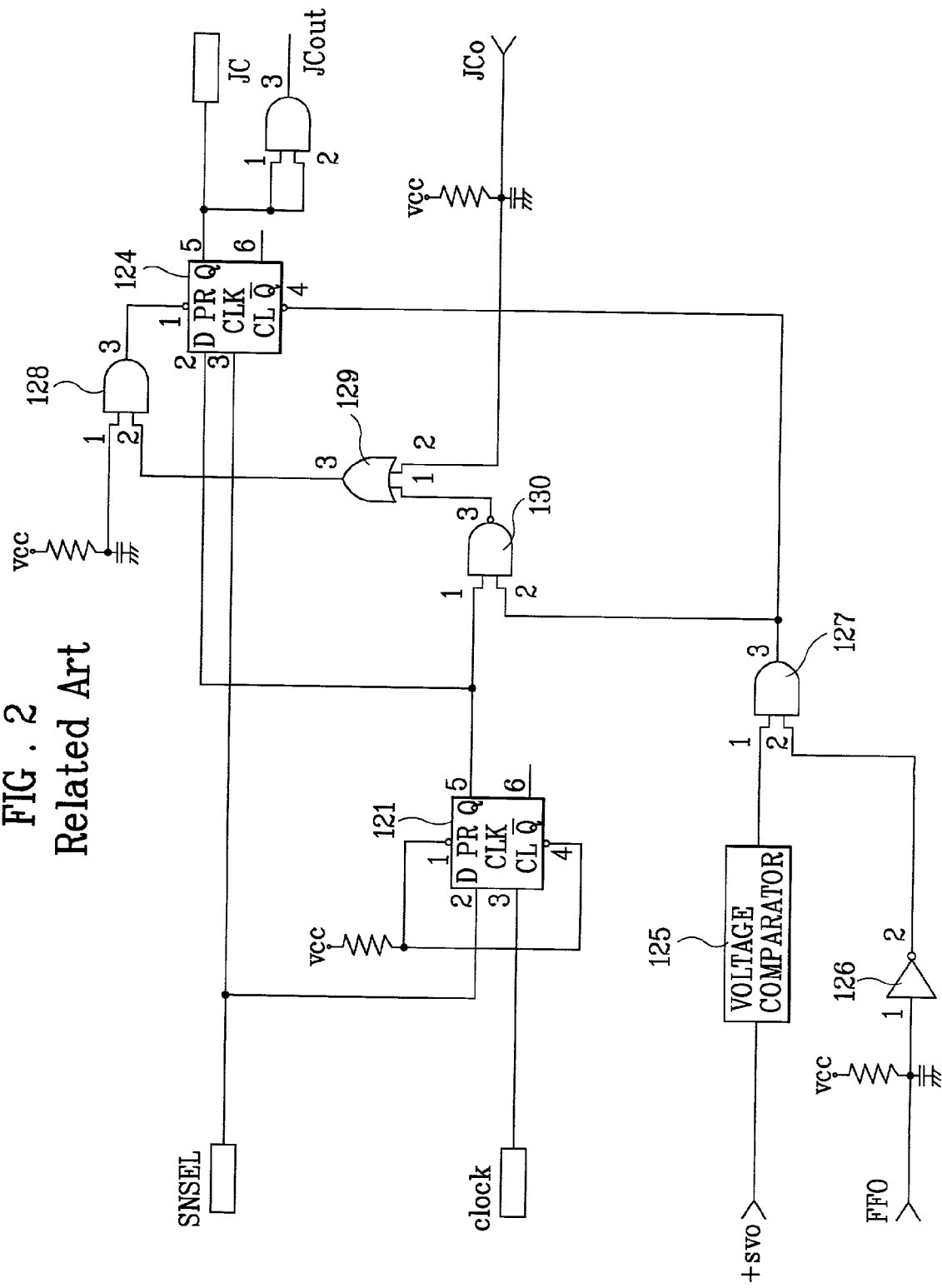
FIG. 2 illustrates a diagram of another exemplary related art control circuit of a duplex communication system.
Figure 3:
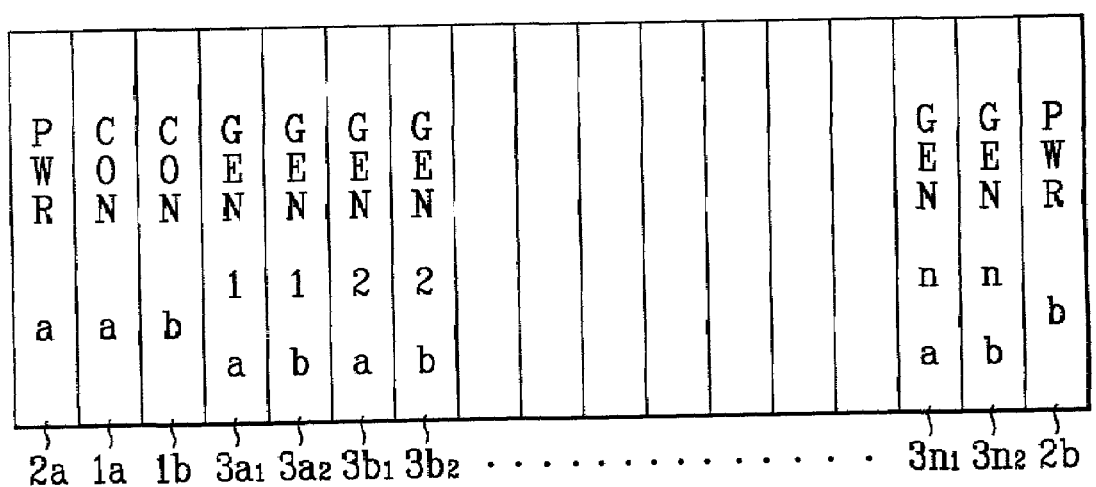
FIG. 3 is a diagram that shows an array of circuit modules in a device for selecting a normal circuit in accordance with a preferred embodiment of the present invention.

FIG. 3 illustrates a diagram that shows an array of circuit modules in a device for selecting a normal circuit in accordance with a preferred embodiment according to the present invention. As shown in FIG. 3, the device for selecting a normal circuit in accordance with the preferred embodiment according to the present invention preferably includes a pair of power supply modules 2a and 2b at opposite ends of a board for generating a power supply signal and a power fail signal, and a pair of control function circuit modules 1a and 1b preferably adjacent to the first power supply module 2a for monitoring states of a system clock, states of a processor matching, and states of general function circuit modules, which are common functions of the device for selecting a normal circuit. Pairs of general function circuit modules 3a1, 3a2, 3b1, 3b2, . . . , 3n1 and 3n2 are provided between the pair of control function circuit modules 1a and 1b and the second power supply module 2b.

Figure 4:
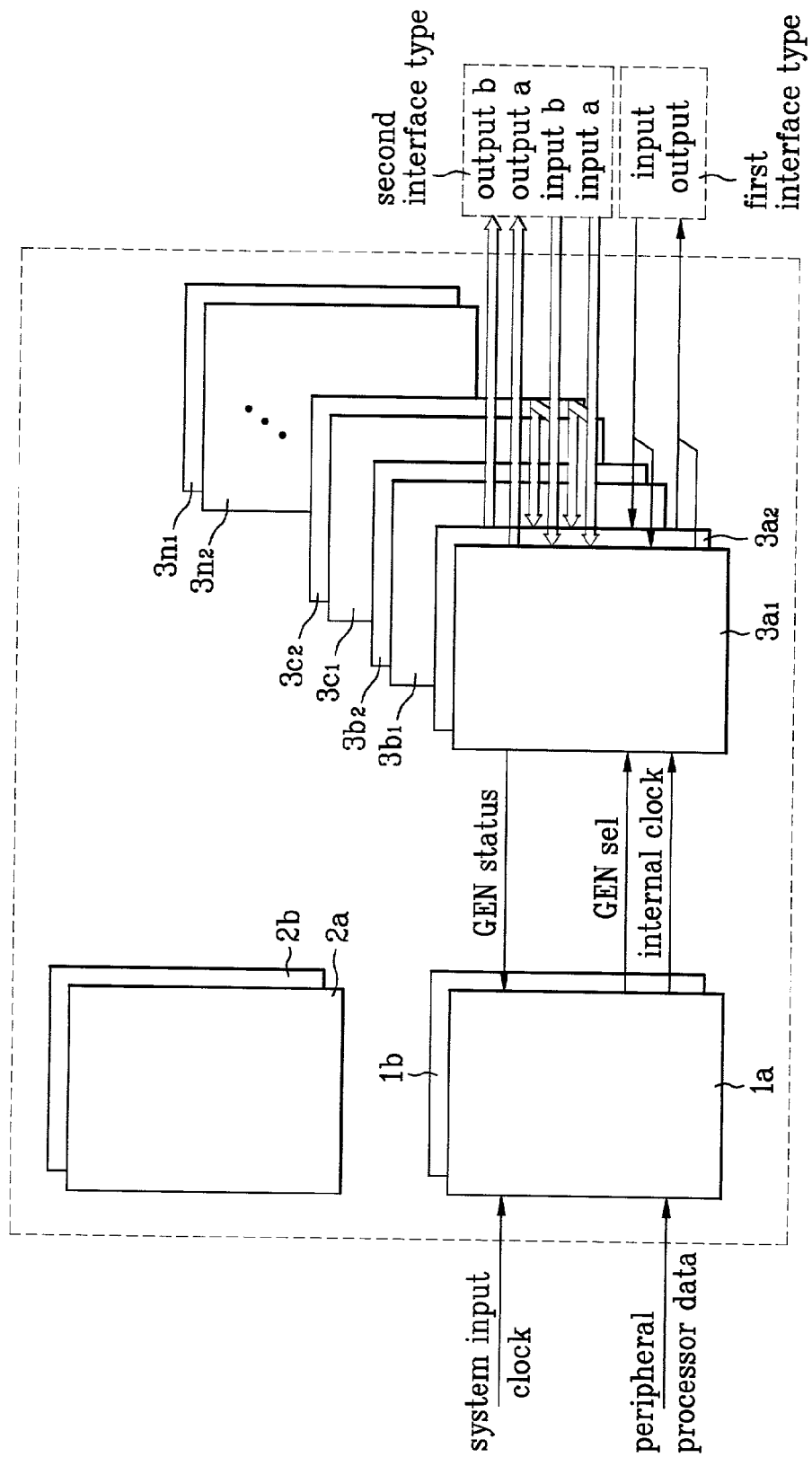
FIG. 4 is a diagram that shows a system of a device for selecting a normal circuit in accordance with a preferred embodiment of the present invention.
Figure 5:
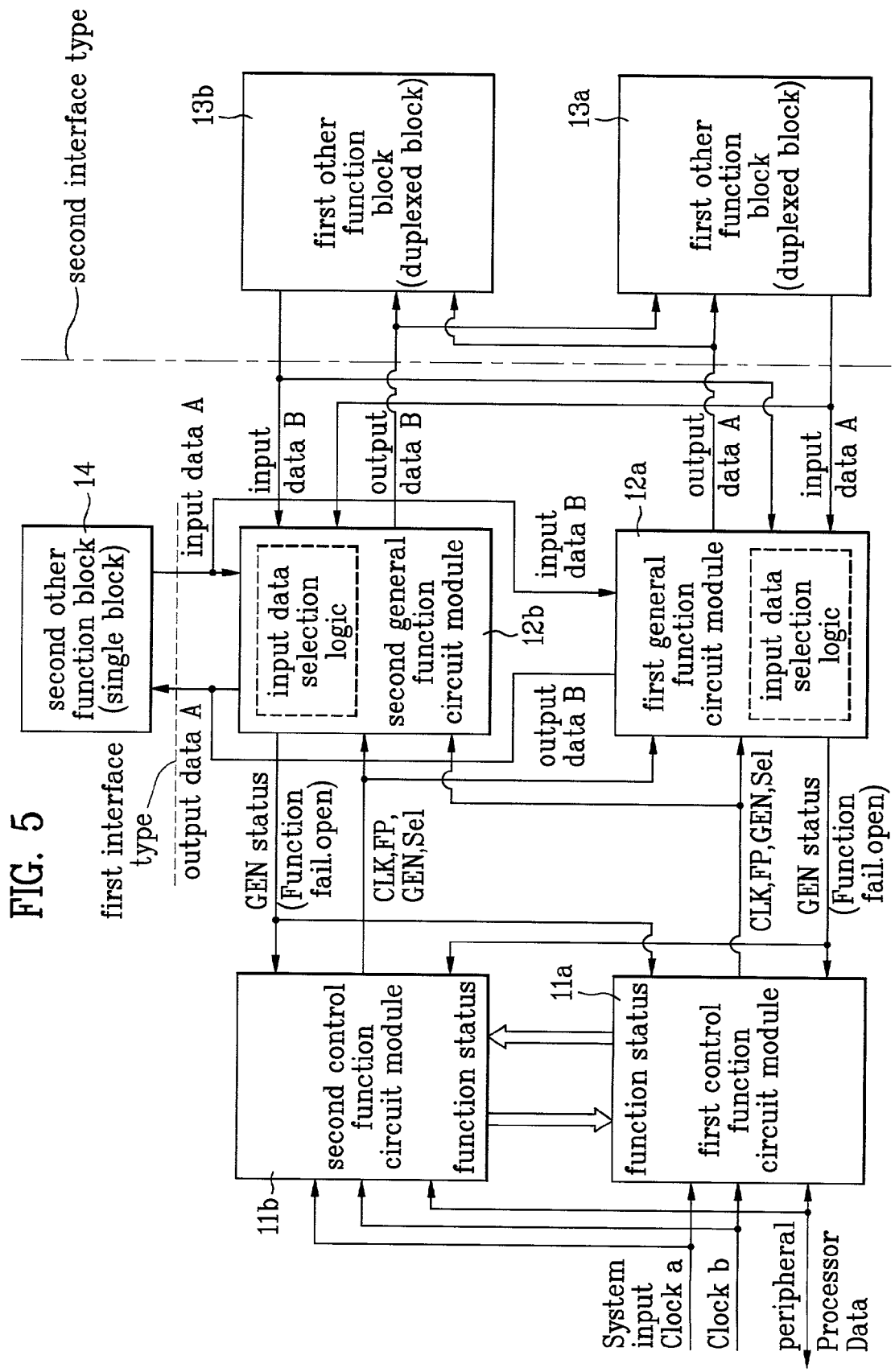
FIG. 5 a diagram that shows interfaces between components of a device for selecting a normal circuit in accordance with a preferred embodiment of the present invention.

FIG. 4 illustrates a diagram showing kinds of data preferably provided to/from the preferred embodiment of the device for selecting a normal circuit shown in FIG. 3 according to interfaces with other blocks. FIG. 5 illustrates a diagram showing interfaces between components of the preferred embodiment of the device for selecting a normal circuit in FIG. 3 according to forms of the interfaces with other blocks.

As shown in FIGS. 4 and 5, the pair of power supply modules (e.g., 2a and 2b) generate a power fail alarm. The pair of control function circuit modules 1a and 1b or 11a and 11b can select a good one from a pair of system input clocks (e.g., clock a, clock b) provided from outside of the device for selecting a normal circuit, and provide the same to its components as operative clocks. Also, the pair of control function circuit modules 1a and 1b, or 11a and 11b monitor functions of the pairs of general function circuit modules 3a1, 3a2, 3b1, 3b2, . . . , 3n1 and 3n2, for selecting a pair of the general function circuit modules under normal operation. In other words, the control function circuit modules 1a and 1b, or 11a and 11b can monitor states of the general function circuit modules 3a1, 3a2, 3b1, 3b2, . . . , 3n1 and 3n2, and report the monitored states to a peripheral processor (not shown). Then, the control function circuit modules 1a and 1b or 11a and 11b preferably receive selection data from the peripheral processor, select a pair of normal operation general function circuit modules (3a1, or 3a2), (3b1, or 3b2), . . . , (3n1, or 3n2) (12a, or 12b) from the pairs of the general function circuit modules (3a1, 3a2), (3b1, 3b2), . . . , (3n1 and 3n2) (12a and 12b), and make a state of a control data and a state of data of the preferred embodiment of the device for selecting a normal circuit consistent.

In the meantime, the preferred embodiment of the device for selecting a normal circuit preferably matches with another function block to exchange communication data. In this instance, if the general function circuit module in a second other function block in FIG. 5 is in a form of a device for selecting a normal circuit, the preferred embodiment of the device for selecting a normal circuit can interface with a second other function block 14 in a first interface data type 'A'. That is, input data is provided to the pair of the general function circuit modules 3a1 and 3a2, or 12a and 12b in common, and two output data of the pair of the general function circuit modules 3a1 and 3a2 or 12a and 12b are preferably subjected to a wired OR operation, to produce one output data.

When the other function block is in duplex with first other function blocks 13a and 13b in FIG. 5, the preferred embodiment of the device for selecting a normal circuit can be connected to duplexed first other function blocks 13a and 13b using a second data interface type 'B'. That is, two input data are transferred from the duplexed first other function blocks 13a and 13b to the device for selecting a normal circuit, and two output data are transferred from the device for selecting a normal circuit to the duplexed first other function blocks 13a and 13b. The two output data from the device for selecting a normal circuit are processed at the duplexed first other function blocks 13a and 13b.

In a case of the first interface type A, the pairs of the general function circuit modules (3a1, 3a2), (3b1, 3b2), . . . , (3n1, 3n2), (12a, 12b) in the device for selecting a normal circuit preferably select one of two data from the pair of two circuit modules for output to the second other function block 14, while the pairs of the general function circuit modules (3a1, 3a2), (3b1, 3b2), . . . , (3n1, 3n2), (12a, 12b) in the device for selecting a normal circuit preferably receives the unified input data from the second other function block 14 as it is and processes the unified input data. Therefore, an output port selection circuit or the like is required for the first interface type.

In a case of the second interface type B, one of two input data provided from the duplexed first other function block 13a and 13b is selected at each of the pairs of the general function circuit modules (3a1, 3a2), (3b1, 3b2), . . . , (3n1, 3n2), (12a, 12b), while the two data from the pairs of the general function circuit modules (3a1, 3a2), (3b1, 3b2), . . . , (3n1, 3n2), (12a, 12b) are provided to the duplexed first other function blocks as they are. Therefore, an input port selection circuit or the like is required for the second interface type.

FIG. 5 is a diagram showing control signals for selecting general function circuit modules under normal operation in the device for selecting a normal circuit. Though only one pair of the general function circuit modules 12a and 12b are shown in FIG. 5 as an example in the device for selecting a normal circuit, a plurality of pairs of the general function circuit modules may be provided in the device for selecting a normal circuit. The pair of the general function circuit modules 12a and 12b provide own state information to the pair of control function circuit modules 11a and 11b respectively, and the selected one of the control function circuit modules 11a or 11b determines the received state information. For example, if it is the first interface type, the selected one of the control function circuit modules 11a or 11b preferably provides selection information and a system clock required at the general function circuit modules 12a and 12b to the general function circuit modules 12a and 12b, for selecting an output port of one of the general function circuit modules 12a and 12b under normal operation. On the other hand, state information is exchanged between the control function circuit modules 11a and 11b for selecting one of the control function circuit modules 11a or 11b under normal operation.

Figure 6A:
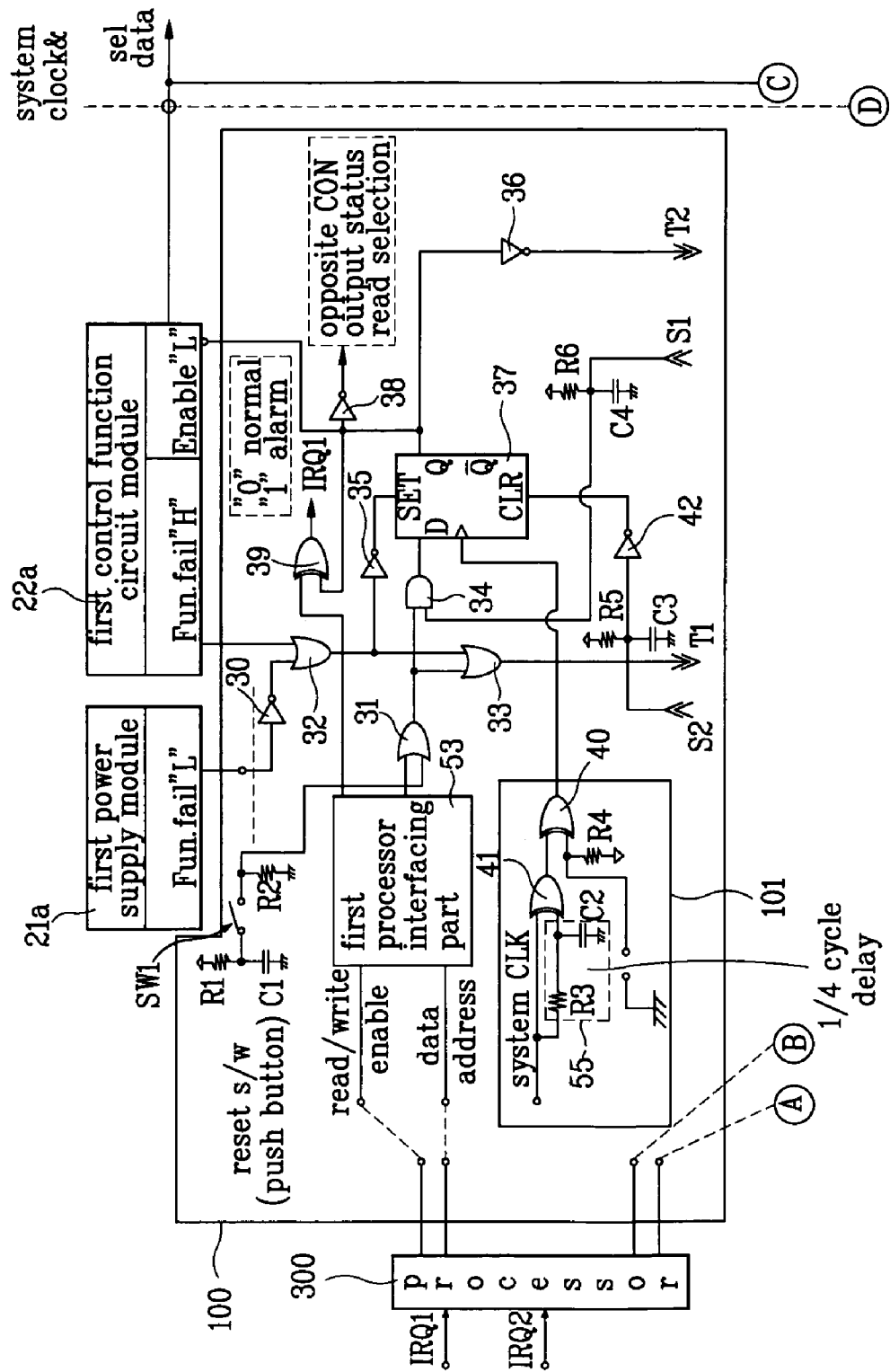
FIGS. 6A–6B are diagrams that shows a preferred embodiment of a circuit for selecting a control function circuit module under normal operation from each pair of control function circuit modules according to the present invention.
Figure 6B:
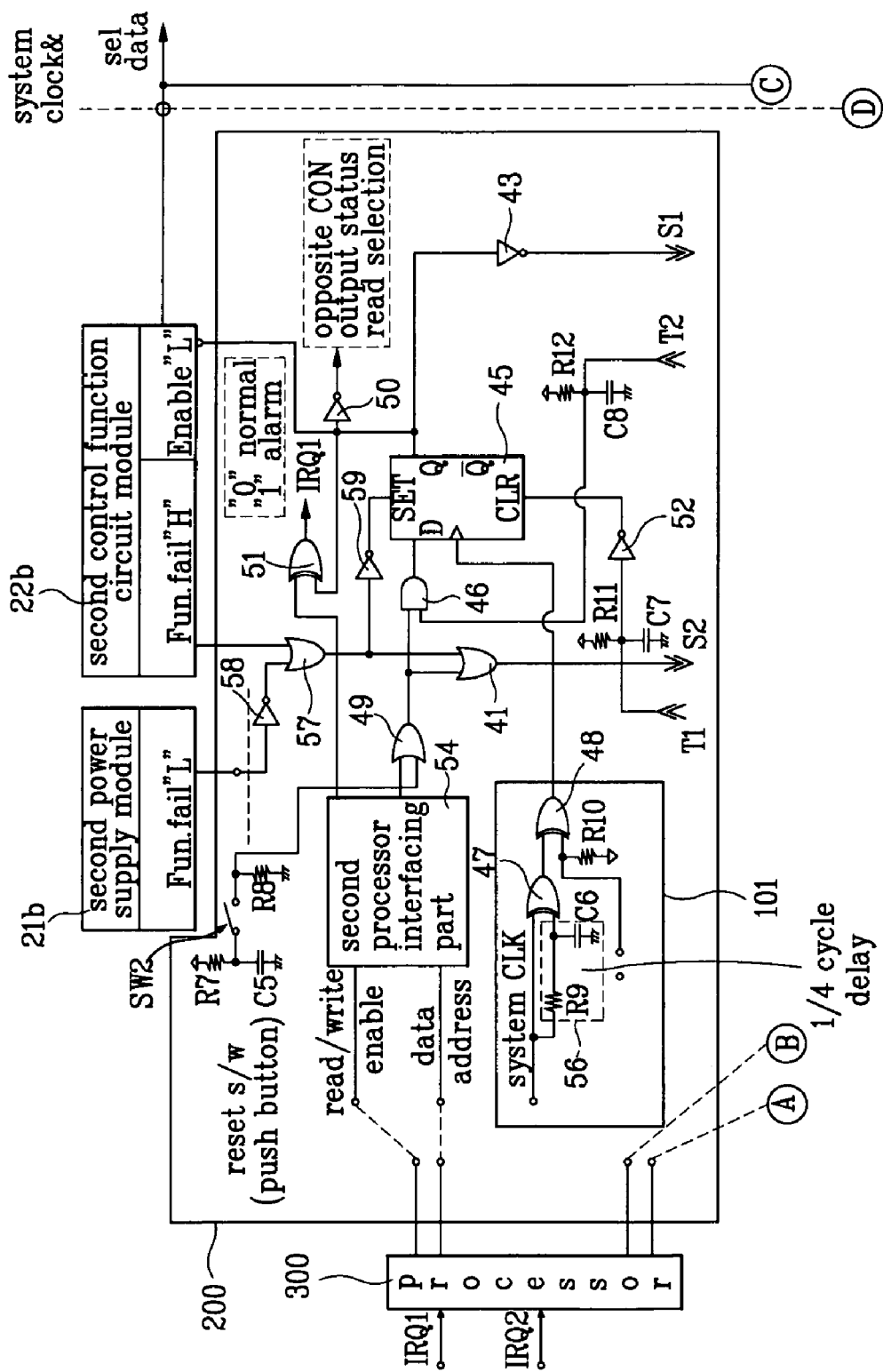

FIGS. 6A–6B are diagrams showing a preferred embodiment of a circuit for selecting a duplexed control function circuit module according to the present invention that can be used in the preferred embodiment of the device for selecting a normal circuit in FIG. 3. As shown in FIGS. 6A–6B, a first selecting circuit includes a first selecting part 100, and a second selecting part 200, which is coupled to receive signals A, B, C and D, and preferably has a similar structure to the first selecting part 100. In FIGS. 6A–6B, the reference numerals 101 and 201 denote clock providing parts, R1–R12 denote resistors, and C1–C8 denote capacitors. The first selecting part 100 provides an output enable signal to the first control function circuit module 22a in response to state signals of the processors, a power fail signal from the first power supply module 21a among the two power supply modules, and a function failure signal from the first control function circuit module 22a among the two control function circuit modules. The second selecting part 200 provides an output enable signal to the second control function circuit module 22b in response to state signals of the processors, the power fail signal from the second power supply module 21b among the two power supply modules, and the function failure signal from the second control function circuit module 22b among the two control function circuit modules. The first selecting part 100 and the second selecting part 200 preferably exchange information so that one of the first control function circuit module 22a and the second control function circuit module 22b, which are both operating normally, is selected to be active.

The first selecting part 100 includes a first reset switch SW1, a first processor interfacing part 53 for receiving state signals from a processor for controlling the preferred embodiment of the device for selecting a normal circuit, a first OR gate 31 for subjecting an output signal of the first reset switch SW1 and an initial state signal of the first processor interfacing part 53 to an OR operation, a first inverter 30 for inverting the power fail signal from the first power supply module 21a, a second OR gate 32 for subjecting an output signal of the first inverter 30 and the function failure signal of the first control function circuit module 22a to an OR operation, and a second inverter 35 for inverting an output signal of the second OR gate 32. The first selecting part 100 also includes a first AND gate 34 for subjecting a first state signal S1 from the second selecting part 200 and an output signal of the first OR gate 31 to an AND operation, a third inverter 42 for inverting a second state signal S2 from the second selecting part 200, and a first D flipflop 37. The first D flipflop 37 receives an output signal of the third inverter 42 at a clear terminal CLR, an output signal of the first AND gate 34 at an input terminal D, and an output signal of the second inverter 35 to a set terminal SET, for providing a signal from an output terminal Q that either enables or disables the first control function circuit module 22a depending on states of the received signals at respective terminals.

The first selecting part 100 also includes a third OR gate 33 for subjecting an output signal of the first OR gate 31 and an output signal of the second OR gate 32 to an OR operation to output a first state signal to the second selecting part 200, a fourth inverter 38 for inverting a state of the output terminal Q on the first D flipflop 37 to output a selection signal for reading an output state of the second control function circuit module 22b, and a fifth inverter 36 for inverting a state of the output terminal Q of the first D flipflop 37 and providing an output to the second selecting part 200 as a second state signal T2. The first selecting part 100 also includes a first exclusive OR gate 39 for subjecting an initial state value of the first processor interfacing part 53 and a state value of the output terminal Q of the first D flipflop 37 to an exclusive OR operation, and providing to a processor 300 as a first interrupt signal IRQ1, and a first clock providing part 101 for providing a clock signal to the first D flipflop 37 by using a system clock signal. The processor 300 preferably makes the state value of the output terminal Q on the first D flipflop 37 and the initial state value of the first processor interfacing part 53 to be the same.

The first clock providing part 101 preferably provides a clock having a cycle period the same with a clock of the second selecting part 200 or a clock inverted from the clock of the second selecting part 200, to the first selecting part 100. Opposite to this, the first clock providing part 101 provides a clock having a cycle period different from a cycle period of the system clock by a preset cycle period to the first D flipflop 37 when the state of the first control function circuit module 22a is converted or switched. The first clock providing part 101 in the first selecting part 100 includes a quarter delay 55 for multiplying the system clock signal by a quarter cycle period, a second exclusive OR gate 41 for subjecting an output signal of the quarter delay 55 and the system clock to exclusive OR operation, and a third exclusive OR gate 40 for subjecting a logic signal depending on a location of insertion of the first control function module 22a and an output signal of the second exclusive OR gate 41 to an exclusive OR operation.

As shown in FIG. 6B, the second selecting part 200 preferably includes a second reset switch SW2, a second processor interfacing part 54 for receiving state signals from the processor 300, a fourth OR gate 49 for subjecting an output signal of the second reset switch SW2 and an initial state signal of the second processor interfacing part 54 to an OR operation, a sixth inverter 58 for inverting the power fail signal from the second power supply module 21b, a fifth OR gate 57 for subjecting an output signal of the sixth inverter 58 and the function failure signal of the second control function circuit module 22b to an OR operation, and a seventh inverter 59 for inverting an output signal of the fifth OR gate 57. The second selecting part 200 also includes a second AND gate 46 for subjecting a second state signal T2 from the first selecting part 100 and an output signal of the fourth OR gate 49 to an AND operation, an eighth inverter 52 for inverting a first state signal T1 from the first selecting part 100, and a second D flipflop 45. The second D flipflop 45 receives an output signal of the eighth inverter 52 at a clear terminal CLR, an output signal of the second AND gate 46 at an input terminal D, and an output signal of the seventh inverter 59 at a set terminal SET to provide a signal from the output terminal Q that either enables or disables the second control function circuit module 22b depending on states of the received signals at respective terminals of the second D flipflop 45.

The second selecting part 200 also includes a sixth OR gate 44 for subjecting an output signal of the fourth OR gate 49 and an output signal of the fifth OR gate 57 to an OR operation and providing an output signal to the first selecting part 100 as a second state signal S2, a ninth inverter 50 for inverting a state of the output terminal Q on the second D flipflop 45 and providing a selection signal for reading an output state of the first control function circuit module 22a, and a tenth inverter 43 for inverting a state of the output terminal Q of the second D flipflop 45 and providing a first state signal S1 to the first selecting part 100. The second selecting part 200 also includes a fourth exclusive OR gate 51 for subjecting an initial state value of the second processor interfacing part 54 and a state value of the output terminal Q of the second D flipflop 45 to an exclusive OR operation, and providing a second interrupt signal IRQ2 to the processor 300, and the second clock providing part 201 for providing a clock signal to the second D flipflop 45. The processor 300 preferably makes the state value of the output terminal Q on the second D flipflop 45 and the initial state value of the second processor interfacing part 54 to be the same.

The second clock providing part 201 provides a clock having a cycle period the same with a clock of the first selecting part 100 or a clock inverted from the clock of the first selecting part 100, to the second selecting part 200. Opposite to this, the second clock providing part 201 provides a clock having a cycle period different from a cycle period of the system clock by a preset cycle period to the second D flipflop 45 when the state of the second control function circuit module 22b is converted or switched. The pair of the control function circuit modules 22a and 22b in the preferred embodiment of the device for selecting a normal circuit preferably exchange state signals even in a state when both of the pair of the power supply modules 21a and 21b supply power, for selecting the control function circuit module under normal operation and a general function circuit module without any loss of a communication data.

In preferred embodiments according to the present invention, when any one of the control function circuit modules is selected to be in an operation or active state (e.g., the control function circuit module 22a), the other one is selected to be in a standby state. When it is intended to change the states of a pair of control function circuit modules (e.g., standby to active and active to standby), at first the already selected operation state control function circuit module (22a) always gives information on the switching to the standby state control function circuit module (22b). Therefore, the operation state of the control function circuit module may not be maintained on the same time, and the preferred embodiment of the selecting circuit of FIG. 6 determines that the operation state of the already selected control function circuit module (22a) is not affected by output variation of the standby state control function circuit module (22b). The control function circuit modules 22a and 22b are designed to feed outputs of positive edge triggered D flipflops (called D flipflop, in short) 37 and 45 back to the processor interfacing part 53 or 54, for adjusting read/write states of the processor interfacing parts 53/54. In other words, the already selected control function circuit module enables the read/write states of the processor interfacing part 53 or 54, and the unselected control function circuit module enables only the read state of the processor interfacing part 53 or 54. Therefore, if it is intended that the already selected control function circuit module switches its own state from the operative (active) state to the standby state, the already selected control function circuit module switches the control function circuit module in the standby state into the operative state first and before the switched standby state is exhibited as an output, switches its own state into the standby state. Such operations provide an apparatus and a method that has taken into account a case in which both of the control function circuit modules 22a and 22b are under normal operation. That is, when the switching is made by the control processor in the preferred embodiment of the device for selecting a normal circuit, both outputs of the pair of the control function circuit modules are selected for a quarter cycle period of clock for sustaining continuity of the system.

As described above, the outputs of the control function circuit modules 22a and 22b are fed back to the opposite input terminals. Therefore, if the control function circuit modules 22a and 22b exchange state information to each other under the same clock, the selection of the outputs of the control function circuit modules 22a and 22b can be unstable with the selection alternating between the outputs. Therefore, according to the preferred embodiments, the system clock CLK is multiplied preferably by quarters of a cycle period by using quarter cycle period delays 55 and 56, and subjected to the exclusive OR operation with the system clock CLK. A resultant signal of the exclusive OR operation is provided to one input terminal on the exclusive OR gates 40 and 48, while a low 'L' or high 'H' level signal is provided to the other input terminal on the exclusive OR gates 40 and 48 depending on location of insertion of the control function circuit modules.

As described above, since the system clock is inverted at either one of the pair of control function circuit modules, the clocks provided to the two modules have the same cycle periods and in inverted states to each other. Eventually, the state switching clocks provided to the D flipflops 37 and 45 preferably differ by a quarter cycle period, that facilitates stabilization of the communication system.

As shown in FIGS. 3~6B, for maintaining reliability, a digital communication system has one pair of power supply modules for supplying power to the preferred embodiment of the device for selecting a normal circuit and providing a power fail signal in a case of power failure. Therefore, if power supply to the preferred embodiment of the device for selecting a normal circuit is cut off, a fail alarm signal is preferably generated at 5 ms before 90% of a rated load in a low level, which is provided to a relevant control function circuit module. Though the two power selecting parts 100 and 200 are required to be synchronous, as the two power selecting parts 100 and 200 receive the same clock from a synchronous block in an upper layer communication network, the clocks of the two power selecting parts 100 and 200 are matched, which will now be described with reference to FIGS. 6A–6B.

As shown in FIGS. 6A–6B, if one 22a of the pair of the control function circuit modules is mounted in a single function block at first in a state that the other one 22b is not mounted, the clear terminal CLR on the D flipflop transits to low 'L' by a pull up circuit in the inverter 42 in the selecting circuit in FIG. 6A. On the other hand, a high 'H' signal is provide to the set terminal SET on the D flipflop 37 by the inverter 35 when the first power supply module is normal and the first control function module 22a is normal. Therefore, the output terminal Q on the D flipflop 37 is kept low regardless of a state of the input terminal 'D', enabling an output of the control function circuit module (e.g., 22a). In this instance, since an initial output of the first processor interfacing part 53 is high, an output of the OR gate 31 is high 'H' regardless of the low state initial output of the first reset switch SW1. Meanwhile, since one signal to the AND gate 34 is the output signal of the OR gate 31, and the other signal to the AND gate 34 is a high signal 'H' owing to a pull up resistance, output of the AND gate 34 is high 'H'. Therefore, the input terminal D on the D flipflop 37 is also high "H". As explained, the clear terminal CLR on the D flipflop 37 is in a low 'L' state, the output terminal Q on the D flipflop is kept low 'L' regardless of a state of the input terminal 'D' on the D flipflop 37. On the other hand, since the low state 'L' of the output terminal Q on the D flipflop 37 is different from the high state 'H' of the initial output state of the first processor interfacing part 53, the exclusive OR gate 39 provides a high signal, which is used as an interrupt signal IRQ (e.g., IRQ 1). The interrupt signal is reported to the block control processor 300, and the block control processor 300 converts an output state of the first processor interfacing part 53 into a low state 'L'. Under the foregoing state (i.e., the output signal of the first processor interfacing part 53 is low), preferably when it is intended to insert the second control function circuit module 22b presently in standby into a board, the transient switching state gives no influence to the first control function circuit module 22a in its selected state owing to the AND gate 34. That is, since an output signal of the OR gate 31, one of two signals provided to the AND gate 34, is in low 'L' when the first control function circuit module 22a is selected, the output signal of the AND gate 34 is kept low 'L' regardless of a state of the other signal to the AND gate 34. In other words, in a transient state when the second control function module 22b is newly inserted into the board, even if the output signals of the inverter 43 and the OR gate 44, operation state signals of the second control function circuit module 22b, transit to low states 'L', i.e., even if the second control function circuit module becomes active, either one of the signals to the AND gate 34 is kept low as far as the first control function circuit module 22a is in a selected state, so that the present selected state is not changed. Therefore, even if the other signal to the AND gate 34 is in a high state 'H', the output signal of the AND gate 34 is kept to be in a low state 'L', and the D flipflop 37 can be kept to be in a low state 'L', accordingly. The selection of the control function circuit module under normal operation by an operator or a function alarm during normal operation is preferably possible only for the control function circuit modules always under operation (i.e., normal operation) in an active state, which prevents the control function circuit modules under operation in an abnormal state from being selected to be active.

A reset switch, a block control processor or the like can be used as a switching device for controlling the preferred embodiment of the device for selecting a normal circuit in a normal case. The switching can also occur when a function failure alarm is issued from the control function circuit module in an active state, or a power fail signal is issued from the power supply module. The switching can also occur when the operator dismounts or removes the already selected control function circuit module from the board.

A case when the switching is controlled by the reset switches SW1 and SW2 will now be described. When the first reset switch SW1 in the first selecting part 100 of the first control function circuit module 22a is pressed (e.g., for more than one cycle period of the clock), an output of the first reset switch SW1 transits to a high state 'H', to transit an output signal of the OR gate 31 to transit to a high state. On the other hand, the other signal to the OR gate 31 from the first processor interfacing part 53 is in a low state 'L'. Consequently, the output signal of the OR gate 31 is provided to the OR gate 33 as one input signal, to transit the output signal of the OR gate 33 to a high state 'H'. On the other hand, the clear terminal CLR on the D flipflop 45 in the second selecting part 200, which belongs to the second control function circuit module 22b, transits to a low state 'L'. According to this, the output terminal Q on the D flipflop 45 transits to a low state 'L', which is provided to the second control circuit module 22b as an enable signal. The output signal of the D flipflop 45 is inverted to a high signal by the inverter 43 again, and provided to the AND gate 34 as one input signal. Therefore, the AND gate 34 provides a high state 'H' signal, and the output terminal Q on the D flipflop 37 in the first selecting part 100 transits to a high state 'H'. The high state signal (e.g., Q) disables the first control function circuit module 22a, and switches the first control function circuit module 22a into a standby state. However, when the reset switch SW2 is pressed in a state the second control function circuit module 22b is in standby, since the output signal of the OR gate 49 is already in a high state 'H', the pressing of the reset switch SW2 gives no influences to the selection of the control function circuit module.

A case when the switching is caused by the block control processor 300 will now be described. In order to switch the first control function circuit module 22a from a selected state to a standby state, if the block control processor changes an output state of the first processor interfacing part 53 from a low state to a high state 'H', the output signal of the OR gate 31 transits to a high state 'H'. Processes hereafter are preferably the same with the foregoing processes using the reset switches (e.g., SW1). On the other hand, in order to prevent, for an example, the second control function circuit module 22b in a standby state from changing the output signal of the processor interfacing part 54 to a low state 'L' unintentionally, a state signal of the output terminal Q of the D flipflop 45 is fed back. That is, the feed back signal is in a low state 'L' for the read/write of a state of the second control processor 22 module, and also, a state of the first control function circuit module 22a and a state of the general function circuit module by the block control processor are enabled. However, when the feed back signal is in a high state 'H', only the state readings are enabled. That is, it is preferably not possible to write data by using the block control processor 300 through the control function circuit module in a standby state (e.g., 22b) for selecting the control function circuit module.

Cases when the switching is made by mounting/dismounting the control function circuit module into/from the board will now be described. When the first control function circuit module 22a of a selected state is dismounted from the board by the operator in an emergency, the inverter 52 provides a low state 'L' signal owing to pull up resistances. The low state signals are provided to the clear terminal CLR of the D flipflop 45. Therefore, the output signal of the D flipflop 45 transits to a low state 'L' at the moment the first control function circuit module 22a is dismounted from the board, the second control function circuit module 22b in a standby state is enabled at once to come into operation regardless of the system clock. On the other hand, the second processor interfacing part 54 in the second selecting part 200 belonging to the second control function circuit module 22b switched to an active state provide a high state 'H' signal, and the D flipflop 45 provides a low state 'L' signal. Accordingly, the exclusive OR gate 51 provides an interrupt IRQ signal to the block control processor, and the block control processor, which senses the switching of the control function circuit module, switches an output signal of the second processor interfacing part 54 to a low state 'L'. However, when the control function circuit module in the standby state is dismounted from the board, an output state of the control function circuit module in the selected state is kept without change.

Figure 8:
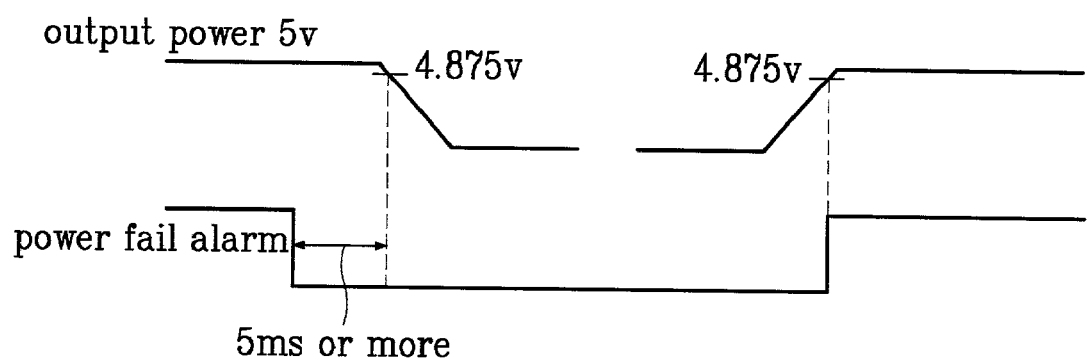
FIG. 8 is a timing diagram that shows operations when a power fail is occurred.

A case where the switching when the power fail signal is issued from the power supply module (e.g., 21a or 21b) will now be described with reference to FIG. 8 that illustrates a timing diagram of a power fail. Upon reception of a low state 'L' power fail signal from the first power supply module 21a belonging to the first control function circuit module 22a (for an example, the power fail signal is at a low state for 5 msec or more as shown in FIG. 8), the output signal of the OR gate 32 is switched to a high state 'H'. The output signal of the OR gate 32 in a high state is provided to the clear terminal CLR on the D flipflop 45 through the OR gate 33 and the inverter 52, to transit the clear terminal CLR to a low state 'L'. Accordingly, the second control function circuit module 22b is enabled, and switched to an active state. This switching process, does not rely on the system clock, but at the same time with the issue of the power fail signal from the first power supply module 21a belonging to the first control function circuit module 22a. The high state output signal is provided to the set terminal SET on the D flipflop in a low state through the inverter 35. Accordingly, the output terminal Q on the D flipflop 37 transits to a high state, to disable the first control function circuit module 22a. Thus, the first control function circuit module 22a is switched to a standby state. In contrast, as described above, even if the power fail signal is issued from the second control function circuit module 22b in a standby state, the output state is not changed. That is, the first control function circuit module 22a is kept to be in an output enable state, and the second control function circuit module 22b is kept to be in a standby state.

A case where switching when the function failure signal is issued from the control function circuit module in a selected state will now be described. When the function failure signal (e.g., in a high state) is issued from the first control function circuit module 22a in a selected state, the output signal of the OR gate 32 transits to a high state 'H'. Processes hereafter are preferably the same with the foregoing case when the power fail signal is issued.

Figure 7:
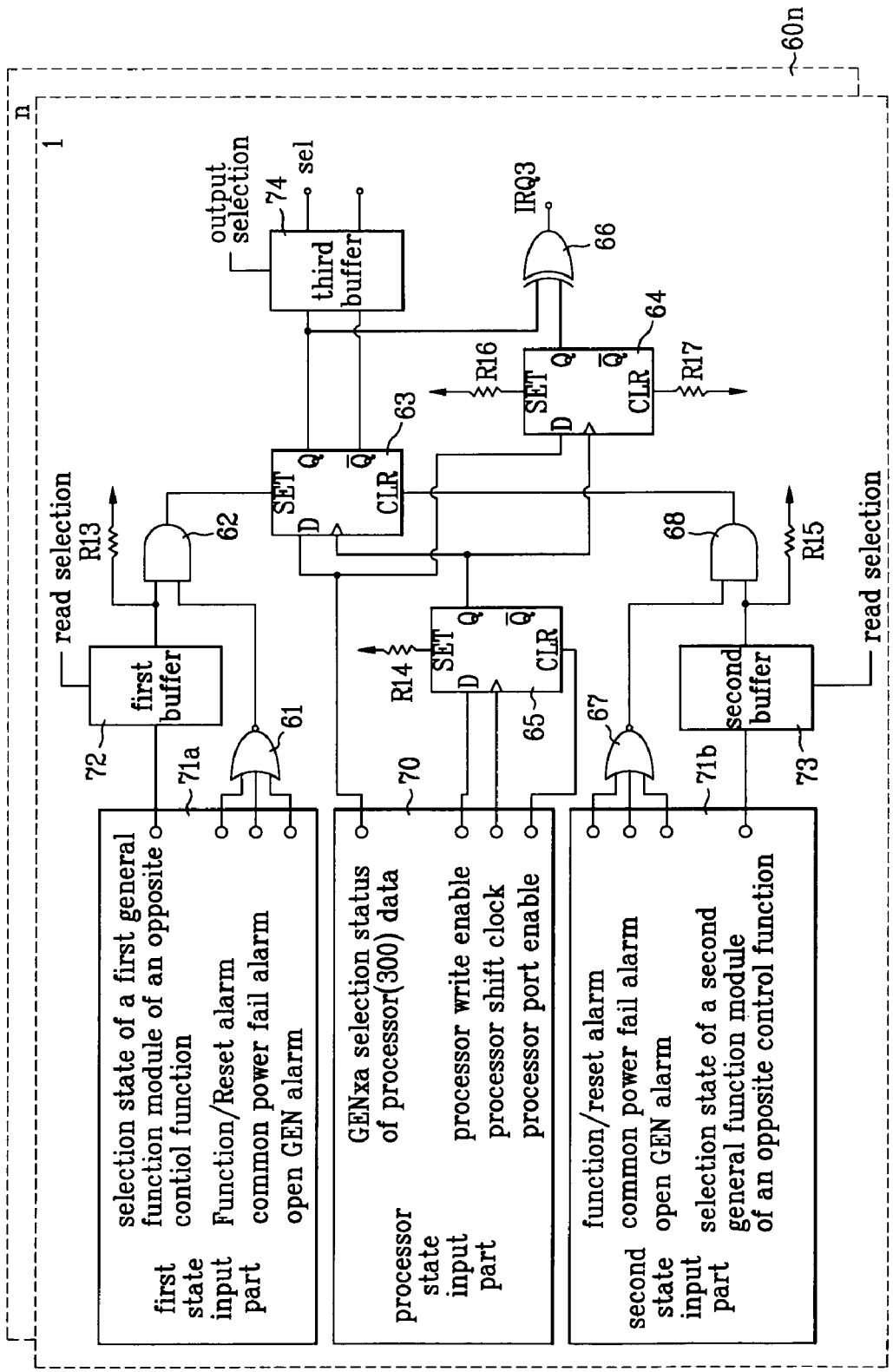
FIG. 7 is a diagram that shows a circuit for selecting a general function circuit module under normal operation from a pair of general function circuit modules.

FIG. 7 is a diagram showing a circuit in each of the control function circuit modules for selecting one of a pair of general function circuit modules. The selecting circuit of FIG. 7 is preferably contained in respective control function circuit modules (e.g., 1a or 1b) as shown in FIG. 3. That is, the selecting circuit contained in respective control function circuit modules collects all information on states of all the general function circuit modules $3a1$, $3a2$, $3b1$, $3b2$, . . . , $3n1$, and $3n2$ in the preferred embodiments of the device for selecting a normal circuit, such as power fail, dismounting of the modules, mounting of the modules, function failure alarm, and the like, and selects a desired (e.g., operational or "good") one of the general function circuit modules $3a1$, $3a2$, $3b1$, $3b2$, . . . , $3n1$, and $3n2$ with reference to the collected information. As shown in FIG. 3, it is assumed that the first control function circuit module 1a is in a selected state, and the second control function circuit module 1b is in a standby state, and both maintains the same state outputs. Under these assumptions, when states of the two control function circuit modules 1a and 1b are switched, the selected states of respective pairs of the general function circuit modules can be switched.

As shown in FIG. 7, the second control function circuit module, which is in a standby state for preventing change of the selected state of the general function circuit modules $3a1$, $3a2$, $3b1$, $3b2$, . . . , $3n1$, and $3n2$, maintains its own standby state constant by receiving a signal corresponding to the selected state of the general function circuit module among the output signals of the opposite first control function circuit module that is in an active state (or the selected state). In other words, respective control function circuit modules preferably disable their own read selection states when they are in active states, and enable respective control function output selection states. Opposite to this, respective control function circuit modules preferably enable their own read selection states when they are in standby states, and enable respective control function output selection states. As information for the foregoing enable states, an output state of the selecting circuit in respective control function circuit module in FIGS. 6A–6B can be used.

FIG. 7 illustrates a diagram showing a circuit in each of the control function circuit modules for selecting one of a pair of general function circuit modules. If there are 'n' ('n' is a positive integer) pairs of general function circuit modules in the device for selecting a normal circuit, each of the control function circuit module preferably has 'n' selecting circuits shown in FIG. 7. In other words, each of the selecting circuit selects one of the two general circuit modules 71a and 71b that operates normally depending on states of the state input parts 71a and 71b thereof pertinent to each of the selecting circuits. That is, each of the selecting circuit only controls a pertinent pair of the general function circuit modules.

FIG. 7 illustrates an exemplary selecting circuit only for one pair of general function circuit modules. The symbols R13–R17 in FIG. 7 are resistors. The selecting circuit in FIG. 7 includes a first state input part 71*a*, a second state input part 71*b*, and a processor state input part 70. The first state input part 71*a* collects state information of the first general function circuit module GEN Xa X: 1~N and provides at least one alarm signal. The first state input part 71*a* also provides a selection state of the first general function circuit module of the opposite control function circuit module. The second state input part 71*b* collects state information of each pair of the second general function circuit modules and provides at least one alarm signal. The second state input part 71*b* also provide a selection state of the second general function circuit module of the opposite control function circuit module. The processor state input part 70 provides selection information, and write enable, shift clock, and port enable signals of the general function circuit modules provided by the block control processor 300 in FIGS. 6A–6B. The selecting circuit also includes a first NOR gate 61 for subjecting the alarm signals from the first state input part 71*a* to NOR operation, a first buffer 72 for buffering the selection state of the first general function circuit module from the opposite control function module according to a read selection state of a relevant control function circuit module, a third AND gate 62 for subjecting outputs of the first NOR gate 61 and the first buffer 72 to an AND operation, and a third D flipflop 65.

The third D flipflop 65 has an input terminal D for receiving a write enable signal from the processor state input part 70, a clock terminal for receiving a shift clock signal, a clear terminal CLR for receiving a port enable signal, and an output terminal Q for providing an output signal according to the foregoing received signals. The selecting circuit also includes a second NOR gate 67 for subjecting the alarm signals from the second state input part 71*b* to NOR operation, a second buffer 73 for buffering the selection state of the second general function circuit module from the opposite control function module according to a read selection state of a relevant control function circuit module, a fourth AND gate 68 for subjecting outputs of the second NOR gate 67 and the second buffer 73 to an AND operation, and a fourth D flipflop 63. The fourth D flipflop 63 has an input terminal D for receiving selection information on the general function circuit module provided by the processor state input part 70, a clock terminal for receiving an output signal of the third D flipflop 65, a set terminal SET for receiving an output of the third AND gate 62, a clear terminal CLR for receiving an output of the fourth AND gate 68, and output terminals Q and Q− for providing an output signal and an inverted output signal according to the received signals.

The selecting circuit shown in FIG. 7 also includes a fifth D flipflop 64, a third buffer 74, and a seventh exclusive OR gate 66. The fifth D flipflop 64 has an input terminal D for receiving selection information on the general function circuit module from the processor state input part 70, a clock terminal for receiving an output signal of the third D flipflop 65, and a terminal Q for providing an output signal according to the foregoing input signals. The third buffer 74 buffers the output signal and the inverted output signal of the fourth D flipflop 63 depending on an output selection state of the relevant control function circuit module, and provides as a selection signal for selecting one of general function circuit module that operates normally among the pairs of the general function circuit modules. The seventh exclusive OR gate 66 subjects output signals of the fourth D flipflop and the fifth D flipflop 64 to an exclusive OR operation, and provides a third interrupt signal IRQ3 to the block control processor 300. In this instance, the block control processor 300 preferably maintains states of the output terminal Q on the fourth D flipflop 63 and the input terminal D the same in response to the third interrupt signal IRQ3.

As shown in FIG. 7, operations of the selecting circuit for the general function circuit module will now be described. According to the selecting circuit shown in FIG. 7, each of the control function circuit modules collects state signals (for example, function alarms, reset alarms, dismounting alarms, common power source fail alarms) of the pair of general function circuit modules through the state input part 71*a* of the first general function module and the state input part 71*b* of the second general function circuit module. The control function circuit module is provided with the D flipflop 63 for selecting the state input part 71*a* or 71*b* of one of the pair of general function circuit modules no alarm is issued therefrom if even one of the above alarms are received through the state input part 71*a* or 71*b*. In FIG. 7, the D flipflop 63 is a positive edge triggered D type flipflop. For an example, if it is assumed that the first control function circuit module 1*a* in FIG. 3 is in a selected state, as a read selection state of the first control function circuit module 1*a* is a disable state, an output state of the three state buffer is kept to be in a high state 'H' by the pull up resistor R1. Therefore, the selected state of the first general function circuit module may be kept or switched to a standby state by the alarm signals received from the state input part 71*a* of the first general function circuit module. In particular, the first state input part, i.e., the state input part 71*a* of the first general function circuit module receives alarm signals from the first general function through the NOR gate 61, and the second state input part 71*b* of the second general function circuit module receives alarm signals from the second general function circuit module through the NOR gate 67. Then, the alarm signals are provided to the set terminal SET and the clear terminal CLR of the edge triggered D flipflop 63 through relevant AND gates 62 or 68 in FIG. 7. According to characteristics of the positive edge triggered D flipflop 63, when the AND gate 62 has a low state 'L' output, and the AND gate 68 has a high state output 'H', a state of the output terminal Q of the D flipflop 63 is in a high state 'H'. As a result, the D flipflop 63 is made to select the second state input part 71*b* of the second general function circuit module regardless of the state of the input terminal D of the D flipflop 63.

When an output of the AND gate 62 is in a high state 'H' and an output of the AND gate 68 is in a low state 'L', the output terminal Q of the D flipflop 63 is in a low state 'L'. As a result, the D flipflop 63 selects the first state input part 71*a* for the first general function circuit module. The buffer 74 at the output terminal in FIG. 7 is enabled when the first control function circuit module 1*a* is selected, for providing an output of the D flipflop 63 to the pair of general function circuit modules through the buffer 74 as a control signal. If the pair of the general function circuit modules are normal, with both of the AND gates 62 and 68 kept in high states 'H', the output terminal Q on the D flipflop 63 is kept in an initial state. If the input terminal 'D' and the output terminal Q of the D flipflop 63 have different states, an interrupt signal IRQ3 is produced from the exclusive OR gate 66 in FIG. 7, and provided to the block control processor 300. Then, the block control processor 300 changes a state of the input terminal 'D' on the D flipflop 63, to make the interrupt signal IRQ3 normal.

Meanwhile, when the first control function circuit module 1*a* is in a standby mode, the output selection of the first control function circuit module 1*a* is in a disabled state, and the read selection state of the first control function circuit module 1*a* is in an enable state. In this instance, the first control function circuit module 1a reads in a selection data for selecting the general function circuit module from the second control function circuit module 1b in a selected state through the first and second state input parts 71a and 71b. As a result, the first control function circuit module 1a reads in a selection state for selecting the general function circuit module from the second function circuit module 1b in a selected state, and is kept in the same state, for being ready for the control function circuit module switching.

As described above, preferred embodiments of a device for selecting a normal circuit in a communication system and methods for using same according to the present invention have various advantages. When a processor for a device for selecting a normal circuit intends to switch control function circuit modules in active and standby states into a standby state, the switching state is transmitted to the control function circuit module in the standby state at first. After the control function circuit module in the standby state is switched into the active state, the control function circuit module in the active state is switched into the standby state. Such state switching according to the preferred embodiments between one pair of control function circuit modules reduces or prevents the loss of data.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device for selecting a normal circuit in a communication system comprising:
   at least one pair of general function circuit modules;
   one pair of control function circuit modules, each of the control function circuit modules including at least one first selecting circuit that selects one of the two general function circuit modules in each of said at least one pair that is in normal operation and provides a respective function failure signal when the control function circuit modules have function failure;
   one pair of power supply modules that supply power to the modules and provide a respective power fail signal when a power failure occurs;
   a separate processor that controls the modules; and
   a second selecting circuit that switches states of the two control function circuit modules responsive to the control of the processor and the failure signals, wherein the second selecting circuit switches the control function circuit module of the pair in an active state to a standby state after switching the control function circuit module of the pair in the standby state to the active state,
   wherein the processor enables read/write states of the control function circuit module in the active state, and wherein the processor enables only a read state of the control function circuit module in the standby state to prevent an output state of the control function circuit module in the active state from being changed by the output state of the control function circuit module in the standby state.

2. A device for selecting a normal circuit in a communication system comprising:
   at least one pair of general function circuit modules;
   one pair of control function circuit modules, each of the control function circuit modules including at least one first selecting circuit that selects one of the two general function circuit modules in each of said at least one pair that is in normal operation and provides a respective function failure signal when the control function circuit modules have function failure;
   one pair of power supply modules that supply power to the modules and provide a respective power fail signal when a power failure occurs;
   a separate processor that controls the modules; and
   a second selecting circuit that switches states of the two control function circuit modules responsive to the control of the processor and the failure signals, wherein the second selecting circuit switches the control function circuit module of the pair in an active state to a standby state after switching the control function circuit module of the pair in the standby state to the active state,
   wherein when the second selecting circuit switches states of the control function circuit module in the standby state and the control function circuit module in the active state to the other, the control function circuit module in the active state first informs the control function circuit module in the standby state of the switching by the second selecting circuit for preventing output states of the control function circuit module in the standby state and the control function circuit module in the active state from being enabled at the same time.

3. A device for selecting a normal circuit in a communication system comprising:
   at least one pair of general function circuit modules;
   one pair of control function circuit modules, each of the control function circuit modules including at least one first selecting circuit that selects one of the two general function circuit modules in each of said at least one pair that is in normal operation and provides a respective function failure signal when the control function circuit modules have function failure;
   one pair of power supply modules that supply power to the modules and provide a respective power fail signal when a power failure occurs;
   a separate processor that controls the modules; and
   a second selecting circuit that switches states of the two control function circuit modules responsive to the control of the processor and the failure signals, wherein the second selecting circuit switches the control function circuit module of the pair in an active state to a standby state after switching the control function circuit module of the pair in the standby state to the active state,
   wherein the second selecting circuit comprises:
      a first selecting part that provides an output enable signal to the first control function circuit module in response to state signals from the processor, the power fail signal from the first power supply module among the two power supply modules, and the function failure signal from the first control function circuit module among the two control function circuit modules; and
      a second selecting part that provides an output enable signal to the second control function circuit module in response to the state signals from the processor, the power fail signal from the second power supply module among the two power supply modules, and the function failure signal from the second control function circuit module among the two control function circuit modules, wherein the first selecting part and the second selecting part exchange their corresponding state information so that one of the first control function circuit module and the second function circuit module that is in normal operation is selected to be in the active state.

4. The device as claimed in claim 3, wherein the first selecting part comprises:
   a first reset switch;
   a first processor interfacing part for receiving the state signals from the processor;
   a first OR gate for logically processing an output signal of the first reset switch and an initial state signal of the first processor interfacing part;
   a first inverter for inverting the power fail signal from the first power supply module;
   a second OR gate for logically processing an output signal of the first inverter and the function failure signal of the first control function circuit module;
   a second inverter for inverting an output signal of the second OR gate;
   a first AND gate for logically processing a first state signal from the second selecting part and an output signal of the first OR gate;
   a third inverter for inverting a second state signal from the second selecting part;
   a first D flip flop having a clear terminal for receiving an output signal of the third inverter, an input terminal for receiving an output signal of the first AND gate, a set terminal for receiving an output signal of the second inverter, and an output terminal for providing an output signal that selectively enables the first control function circuit module responsive to the received signals;
   a third OR gate for logically processing an output signal of the first OR gate and an output signal of the second OR gate and outputting a first state signal to the second selecting part;
   a fourth inverter for inverting the output signal of the first D flipflop and outputting a selection signal for reading an output state of the second control function circuit module and a second state signal to the second selecting part;
   a first exclusive OR gate for logically processing the initial state value of the first processor interfacing part and the output signal of the first D flipflop and outputting a first interrupt signal to the processor; and
   a first clock providing part for providing a first clock signal to the first D flipflop, wherein the processor makes the output signal of the first D flipflop and the initial state value of the first processor interfacing part equal, and the first clock providing part provides the first clock signal having a cycle period the same with a second clock signal of the second selecting part or the second clock signal inverted to the first selecting part, and wherein the cycle period of the first clock signal is different from a cycle period of a system clock by a prescribed cycle period is provided to the first D flipflop when the state of the first control function circuit module is switched.

5. The device as claimed in claim 4, wherein the first clock providing part comprises;
   a delay for multiplying the system clock signal by a quarter cycle period;
   a second exclusive OR gate for logically processing an output signal of the delay and the system clock; and
   a third exclusive OR gate for logically processing a logic signal dependent on a location of insertion of the first control function module and an output signal of the second exclusive OR gate.

6. The device as claimed in claim 4, wherein the state signals provided from the processor to the first processor interfacing part includes a read enable signal, a write enable signal, a data, and an address.

7. The device as claimed in claim 4, wherein the first D flipflop is a positive edge triggered flipflop.

8. The device as claimed in claim 3, wherein the second selecting part comprises:
   a second reset switch;
   a second processor interfacing part for receiving the state signals from the processor;
   a fourth OR gate for logically processing an output signal of the second reset switch and an initial state signal of the second processor interfacing part;
   a sixth inverter for inverting the power fail signal from the second power supply module;
   a fifth OR gate for logically processing an output signal of the sixth inverter and the function failure signal of the second control function circuit module;
   a seventh inverter for inverting an output signal of the fifth OR gate;
   a second AND gate for logically processing a second state signal from the first selecting part and an output signal of the fourth OR gate;
   an eighth inverter for inverting a first state signal from the first selecting part;
   a second D flipflop having a clear terminal for receiving an output signal of the eighth inverter, an input terminal for receiving an output signal of the second AND gate, a set terminal for receiving an output signal of the seventh inverter, and an output terminal for providing an output signal that selectively enables the second control function circuit module responsive to the received signals;
   a sixth OR gate for logically processing an output signal of the fourth OR gate and an output signal of the fifth OR gate and outputting a second state signal to the first selecting part;
   a ninth inverter for inverting the output signal of the second D flipflop and outputting a selection signal for reading an output state of the first control function circuit module and a first state signal to the first selecting part;
   a fourth exclusive OR gate for logically processing the initial state value of the second processor interfacing part and the output signal on the second D flipflop and outputting a second interrupt signal to the processor; and
   a second clock providing part for providing a second clock signal to the second D flipflop, wherein the processor makes the output signal of the second D flipflop and the initial state value of the second processor interfacing part equal in response to the second interrupt signal, and the second clock providing part provides the second clock having a cycle period equal to a first clock signal of the first selecting part or the first clock signal inverted to the second selecting part, or the second clock providing part provides the second clock signal having the cycle period different from a cycle period of a system clock by a prescribed cycle period to the second D flipflop when the state of the second control function circuit module is converted.

9. The device as claimed in claim 8, wherein the second clock providing part comprises:
- a delay for multiplying the system clock signal by a quarter cycle period;
- a fifth exclusive OR gate for logically processing an output signal of the delay and the system clock; and
- a sixth exclusive OR gate for logically processing a logic signal dependent on a location of insertion of the second control function circuit module and an output signal of the fifth exclusive OR gate.

10. The device as claimed in claim 8, wherein the state signals provided from the processor to the second processor interfacing part includes a read enable signal, a write enable signal, a data, and an address.

11. The device as claimed in claim 8, wherein the first D flipflop is a positive edge triggered flip flop.

12. A device for selecting a normal circuit in a communication system comprising:
- at least one pair of general function circuit modules;
- one pair of control function circuit modules, each of the control function circuit modules including at least one first selecting circuit that selects one of the two general function circuit modules in each of said at least one pair that is in normal operation and provides a respective function failure signal when the control function circuit modules have function failure;
- one pair of power supply modules that supply power to the modules and provide a respective power fail signal when a power failure occurs;
- a separate processor that controls the modules; and
- a second selecting circuit that switches states of the two control function circuit modules responsive to the control of the processor and the failure signals, wherein the second selecting circuit switches the control function circuit module of the pair in an active state to a standby state after switching the control function circuit module of the pair in the standby state to the active state,
- wherein the first selecting circuit comprises:
  - a first state input part that collects state information of the pairs of the first general function circuit modules and provides at least one alarm signal, and also provides a selection state of the first general function circuit module of the opposite control function circuit module;
  - a second state input part that collects state information of the pairs of the second general function circuit modules and provides at least one alarm signal, and also provides a selection state of the second general function circuit module of the opposite control function circuit module;
  - a processor state input part that provides selection information, and write enable, shift clock, and port enable signals on the general function circuit modules of the opposite control function circuit module;
  - a first NOR gate for logically processing the alarm signals from the first state input part;
  - a first buffer for buffering the selection state of the first general function circuit module from the opposite control function module according to a read selection state of a relevant control function circuit module;
  - a first AND gate for logically processing output signals of the first NOR gate and the first buffer;
  - a first D flipflop having an input terminal D for receiving the write enable signal from the processor state input part, a clock terminal for receiving the shift clock signal, a clear terminal for receiving the port enable signal, and an output terminal for providing an output signal;
  - a first NOR gate for logically processing the alarm signals from the second state input part;
  - a second buffer for buffering the selection state of the second general function circuit module from the opposite control function module according to the read selection state of the relevant control function circuit module;
  - a second AND gate for logically processing output signals of the first NOR gate and the second buffer;
  - a second D flipflop having an input terminal for receiving selection information on the general function circuit module of the opposite control function circuit module from the processor state input part, a clock terminal for receiving an output signal of the first D flip flop, a set terminal for receiving an output of the first AND gate, a clear terminal for receiving an output of the second AND gate, and output terminals for providing an output signal and an inverted output signal;
  - a third D flip flop having an input terminal for receiving selection information on the general function circuit module of the opposite control function circuit module from the processor state input part, a clock terminal for receiving an output signal of the first D flipflop, and a terminal for providing an output signal;
  - a third buffer for buffering the output signal and the inverted output signal of the second D flipflop depending on the output selection state of the relevant control function circuit module and outputting a selection signal that selects the general function circuit module that operates normally among said each pair of the general function circuit modules; and
  - an exclusive OR gate for logically processing output signals of the second D flipflop and the third D flipflop and outputs to the processor a third interrupt signal, wherein the processor maintains states of the output terminal on the second D flipflop and the input terminal the same in response to the third interrupt signal.

13. The device as claimed in claim 12, wherein the first, second and third D flipflops are positive edge triggered flipflops.

14. The device as claimed in claim 12, wherein the alarm signals of the first state input part and the second state input part include one of function alarm signals, reset alarm signals, common power fail alarms and open alarm signals of general function circuit modules.

15. A device for selecting a normal circuit in a commurn-catlon system comprising;
- a plurality of pairs of circuit module means;
- first and second control circuit module means, wherein the first and second control circuit module means include a first selecting means that selects one of the two circuit module means in a selected pair and provides a respective function failure signal when the control circuit module means have a function failure;
- a separate control means that controls the device for selecting a normal circuit; and
- a second selecting means that switches states of the two control circuit module means according to the control of the control means and the failure signals, for switching the first control circuit module means in an active state to a standby state after switching the second control circuit module means in the standby state to the active state, wherein the separate control means enables read/write states of the control function circuit module means in the active state, and wherein the separate control means enables only a read state of the control function circuit module means in the standby state to prevent an output state of the control function circuit module means in the active state from being changed by the output state of the control function circuit module means in the standby state.

16. The device as claimed in claim 15, further comprising one pair of power supply module means that supply power to the module means and provide a power fail signal when a power failure occurs.

17. A device for selecting a normal circuit in a communication system comprising:

a pair of power supply modules at opposite ends of a board and configured to generate a power supply signal and a power fail signal;

at least one pair of general function modules;

a pair of control function modules adjacent to a first power supply module of the pair and configured to select one of the pair of general function modules;

a selecting circuit configured to switch a control function module of a pair in an active state to a standby state only after switching a control function module of the pair in a standby state to the active state;

wherein when the selecting circuit switches states of the control function module in the standby state and the control function module in the active state to the other, the control function module in the active state first informs the control function module in the standby state of the switching by the selecting circuit for preventing output states of the control function module in the standby state and the control function module in the active state from being enabled at the same time.

18. The device as claimed in claim 17, further comprising:

a separate processor that controls the modules, wherein the processor enables read/write states of the control function module in the active state, and wherein the processor enables only a read state of the control function module in the standby state to prevent an output state of the control function module in the active state from being changed by the output state of the control function module in the standby state.

* * * * *